(12) United States Patent
Goh et al.

(10) Patent No.: US 9,014,833 B2
(45) Date of Patent: Apr. 21, 2015

(54) SYSTEM FOR REPRODUCTION OF MEDIA CONTENT

(75) Inventors: Aik Hee Daniel Goh, Singapore (SG);
Boon Keat Eddy Toh, Singapore (SG);
Jeng Khim Tan, Singapore (SG); Siow Hui Song, Singapore (SG)

(73) Assignee: Creative Technology Ltd, Singapore (SG)

(*) Notice: Subject to any disclaimer, the term of this patent is extended or adjusted under 35 U.S.C. 154(b) by 961 days.

(21) Appl. No.: 13/128,843

(22) PCT Filed: Nov. 11, 2009

(86) PCT No.: PCT/SG2009/000419
§ 371 (c)(1),
(2), (4) Date: May 11, 2011

(87) PCT Pub. No.: WO2010/056206
PCT Pub. Date: May 20, 2010

(65) Prior Publication Data
US 2011/0218658 A1  Sep. 8, 2011

(30) Foreign Application Priority Data
Nov. 12, 2008 (SG) .............................. 200808394-1

(51) Int. Cl.
*G06F 17/00* (2006.01)
*G11B 27/10* (2006.01)
(Continued)

(52) U.S. Cl.
CPC .......... *G11B 27/105* (2013.01); *H04L 12/2812* (2013.01); *H04L 2012/2841* (2013.01); *H04L 2012/2849* (2013.01); *H04N 21/4126* (2013.01); *H04N 21/4325* (2013.01); *H04N 21/43615* (2013.01); *H04N 21/43637* (2013.01); *H04N 21/439* (2013.01)

(58) Field of Classification Search
CPC ................. H04R 5/02; H04R 2420/07; H04R 2205/021; H04S 3/00; H04L 12/2809; H04L 2012/2849; H04L 67/16; H04L 2012/2841; H04L 29/12226; H04L 65/4069; H04L 12/2805; H04L 12/2812; H04N 21/4126
USPC .............................................. 381/311; 700/94
See application file for complete search history.

(56) References Cited

U.S. PATENT DOCUMENTS

| 4,829,500 A | 5/1989 | Saunders | |
|---|---|---|---|
| 6,845,398 B1* | 1/2005 | Galensky et al. | 709/231 |
| 2002/0115426 A1* | 8/2002 | Olson et al. | 455/410 |
| 2003/0223604 A1* | 12/2003 | Nakagawa | 381/311 |
| 2006/0193273 A1* | 8/2006 | Passier et al. | 370/310 |
| 2007/0299983 A1* | 12/2007 | Brothers | 709/231 |

(Continued)

*Primary Examiner* — Curtis Kuntz
*Assistant Examiner* — Thomas Maung
(74) *Attorney, Agent, or Firm* — Russell Swerdon; Desmund Gean

(57) ABSTRACT

There is provided a system for reproduction of media content. The system includes at least one sound reproduction apparatus being wirelessly connectable to at least one control apparatus via at least one data channel, the at least one control apparatus being connected to the at least one sound reproduction apparatus once the at least one control apparatus receives a first signal indicating a presence of the at least one sound reproduction apparatus; and the at least one control apparatus being wirelessly connectable to at least one data storage apparatus on a data network. Preferably, the at least one sound reproduction apparatus plays back audio signals of the media content which is either stored on the at least one control apparatus or received via the data network, and with the audio signals of the media content being received at a memory module of the at least one sound reproduction apparatus. The audio signals may be played back either in a streaming form or a stored-data playback form, the form depending on the audio signals stored in the memory module.

18 Claims, 2 Drawing Sheets

(51) Int. Cl.
*H04L 12/28* (2006.01)
*H04N 21/41* (2011.01)
*H04N 21/432* (2011.01)
*H04N 21/436* (2011.01)
*H04N 21/4363* (2011.01)
*H04N 21/439* (2011.01)

(56) References Cited

U.S. PATENT DOCUMENTS

2008/0175190 A1* 7/2008 Lee et al. ............... 370/328
2008/0226094 A1* 9/2008 Rutschman ............... 381/79
2008/0242222 A1* 10/2008 Bryce et al. ............. 455/3.06

* cited by examiner

SYSTEM FOR REPRODUCTION OF MEDIA CONTENT

FIELD OF INVENTION

This invention relates to a system for reproduction of media content, primarily to the various aspects and functionalities of the system.

BACKGROUND

The widespread adoption of handheld media players the world over has led to an increasing number of accessories being introduced to enhance the usability and functionality of the handheld media players. Some of these accessories aid in the reproduction of media content played back using the handheld media players.

A category of such accessories which aid in the reproduction of media content from the handheld media players relates to docking apparatus for the handheld media players. To date, there are docking apparatus like the XDock from Creative Technology Ltd which is able to enhance audio output from a handheld media player coupled to the docking apparatus. In addition, there are also docking apparatus like the Playdock i500 from Creative Technology Ltd which is able to amplify audio output from a handheld media player coupled to the docking apparatus.

During use of such docking apparatus, it is typical for the handheld media player to be physically coupled to the docking apparatus. This leads to problems stemming from the handheld media player being out of a user's hand. Given that the docking apparatus is usually positioned at a fixed location, a quality of content shown on a display of the handheld media player would typically be compromised because of the user's distance from the display. In addition, full functionality of the handheld media player is likely to be foregone when the handheld media player is physically coupled to the docking apparatus. Remote controls for the docking apparatus usually do not allow all functions of the physically coupled handheld media player to be accessed.

Some docking apparatus allow wireless connection to the handheld media player. These docking apparatus work on a client-server relationship where the handheld media player stores the music file, and plays it real time according to the user's selection. Where receiver devices are present, the handheld media player acts as a server, sending the audio signals over to the receiver devices in a real time basis.

However, given that the wireless connection is susceptible to interruption and temporary deterioration in the wireless connection quality, such streaming systems typically incorporates error mitigation measures. These measures may include, for example, compact packing of the audio stream at less than the full capability of the wireless link to allow for transmission robustness, as well as to allow for retransmission of lost packets/frames when necessary. It should be noted that packing the audio stream compactly typically requires the use of lossy compression codecs such as, for example, SBC, MP3 or AAC.

Most music files in use nowadays are typically in a compressed format, such as, for example, MP3, AAC, WMA, OGG and so forth. These files have already been through compression, and have to be decoded prior to playback. It should be appreciated that transmitting the compressed music file through a wireless link may require the compressed music file to be decoded and reencoded through SBC, MP3 or AAC after transmission. Such a process for transmitting compressed music files wirelessly requires the music to be encoded twice, resulting in significant loss of quality during each process of lossy compression.

It is also a common problem where either incompatibilities with a wireless technology or incorrect wireless connectivity settings lead to a significant amount of frustration when wirelessly connecting with docking apparatus. Such frustration may lead to abandonment of not only the docking apparatus, but the handheld media player as well.

In light of the aforementioned issues, it should be appreciated that a system for reproduction of media content which is able to overcome the issues mentioned in the preceding paragraphs would be desirable to users of handheld media players.

SUMMARY

There is provided a system for reproduction of media content. The system includes at least one sound reproduction apparatus being wirelessly connectable to at least one control apparatus via at least one data channel, the at least one control apparatus being connected to the at least one sound reproduction apparatus once the at least one control apparatus receives a first signal indicating a presence of the at least one sound reproduction apparatus; and the at least one control apparatus being wirelessly connectable to at least one data storage apparatus on a data network. Preferably, the at least one sound reproduction apparatus plays back audio signals of the media content which is either stored on the at least one control apparatus or received via the data network, and with the audio signals of the media content being received at a memory module of the at least one sound reproduction apparatus. The audio signals may be played back either in a streaming form or a stored-data playback form, the form depending on the audio signals stored in the memory module.

The at least one sound reproduction apparatus may include, for example, a set of speakers, a set of headphones and a set of earphones. The at least one control apparatus may be wirelessly connectable directly with at least one on-site storage apparatus, with the at least one control apparatus being connected to the at least one on-site storage apparatus once the at least one control apparatus receives a second signal indicating a presence of the at least one on-site storage apparatus. The at least one control apparatus may also be configured to control the at least one sound reproduction apparatus. The at least one sound reproduction apparatus may also include controls configured to playback the received audio signals stored in the memory module.

The at least one sound reproduction apparatus may further include a wireless receiver for receiving the audio signals; and an audio file encoder for reproduction of the received audio signals. The audio signals may be received at the memory module either in a transient form or a permanent form. The memory module may also store a profile of the at least one control apparatus to indicate an earlier association of the at least one sound reproduction apparatus with the at least one control apparatus. It is advantageous that settings of the at least one sound reproduction apparatus are associated with the profile of the at least one control apparatus identified in the memory module.

Preferably, reception of the first signal on the at least one control apparatus initiates a first process to enable wireless connection between the at least one control apparatus and the at least one sound reproduction apparatus. Similarly, reception of the second signal initiates a second process to enable wireless connection between the at least one control apparatus and the at least one on-site storage apparatus. Both the first and second signals preferably consume little power during transmission and have a range of at least ten meters. The at least one control apparatus preferably does not transmit audio signals of the media content to the at least one sound reproduction apparatus when the audio signals are present on the at least one sound reproduction apparatus, as the non-transmission of audio signals minimizes power consumption of the at least one control apparatus.

It is advantageous that a priority system is employed by the at least one sound reproduction apparatus to organize the at least one control apparatus, the priority system being for allocating either a priority or a rank to the at least one control apparatus to allow control of the at least one sound reproduction apparatus. The priority system may allocate a rank/priority depending on a factor such as, for example, time of connection to the at least one sound reproduction apparatus, type of the at least one control apparatus, identity of a user of the at least one control apparatus and so forth.

The received audio signals may preferably be time-stamped, with the categorization of the audio signals for playback when the at least one control apparatus is not present being by time-slots, with the time-stamp advantageously determining the time-slot category. The playback of the audio signals in each time-slot may be in a random order. The audio signals may be received either via the at least one control apparatus or direct from the data network.

The at least one sound reproduction apparatus may be operable in two modes, with a first mode of operation being with use of the at least one control apparatus, and a second mode of operation being independent of the at least one control apparatus. It is advantageous that at least one image of the media content is viewable on a display of the at least one control apparatus.

In a second aspect, there is provided a method for wireless transmission of at least one audio file to a sound reproduction apparatus and subsequent playback of the at least one audio file. The method includes selecting the at least one audio file using the control device; storing the at least one audio file on a memory module of the sound reproduction apparatus in an order selected using the control device; decoding the at least one audio file in the order selected using the control device; and playing back the at least one audio file on the sound reproduction apparatus. It is preferable that the at least one audio file is played back either in a streaming form or a stored-data playback form, the form depending on depending on the at least one audio file stored in the memory module. The at least one audio file may be either stored on the control apparatus or received via a data network. Similarly, the at least one audio file is received either via the at least one control apparatus or direct from the data network.

DESCRIPTION OF DRAWINGS

In order that the present invention may be fully understood and readily put into practical effect, there shall now be described by way of non-limitative example only preferred embodiments of the present invention, the description being with reference to the accompanying illustrative drawings.

DESCRIPTION OF PREFERRED EMBODIMENTS

Figure 1:
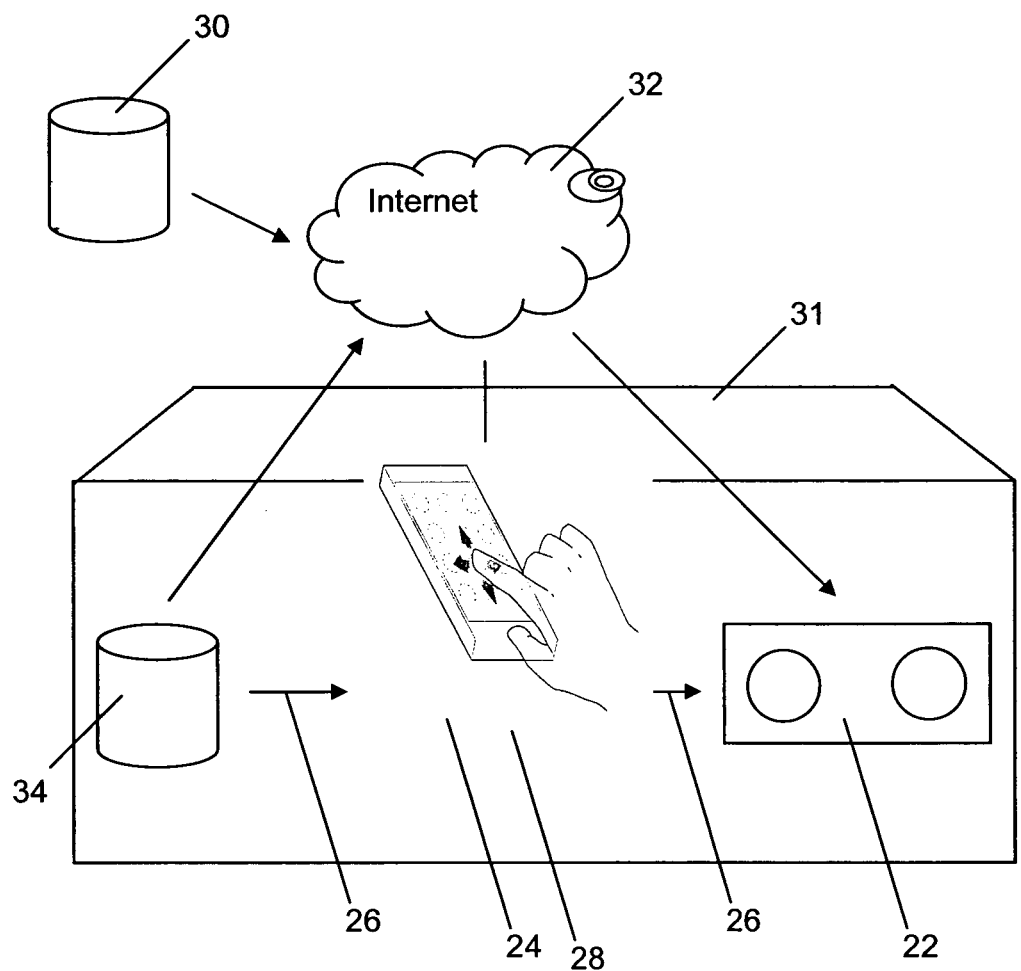
FIG. 1 shows a schematic view of a preferred embodiment of the system of the present invention.

Referring to FIG. 1, there is provided a system 20 for reproduction of media content. The media content may include, for example, audio files, video files, image files, any combination of the aforementioned and so forth. The system 20 includes at least one sound reproduction apparatus 22 being wirelessly connectable to a control apparatus 24 via at least one data channel 26. The at least one sound reproduction apparatus 22 may be, for example, a set of speakers (as shown), a set of headphones, a set of earphones and so forth. The at least one sound reproduction apparatus 22 may play back audio signals of the media content which is either stored on the control apparatus 24 or received via a data network 32.

It should be appreciated that more than one control apparatus 24 may be connected to a single sound reproduction apparatus 22 at a particular instance. In such a particular instance, a priority system may be employed by the single sound reproduction apparatus 22 to organize the plurality of control apparatus 24. The priority system may be configured to allocate a rank/priority in accordance with, for example, time of connection to the sound reproduction apparatus 22, type of the control apparatus 24, identity of a user of the control apparatus 24, and so forth. In a possible embodiment, the control apparatus 24 which has a higher rank/priority is able to over-ride commands sent by a control apparatus 24 which has a lower rank/priority when both control apparatus 24 send commands concurrently. In another possible embodiment, controls sent from the control apparatus 24 with a lower rank/priority are ignored in a presence of the control apparatus 24 with a higher rank/priority.

For example, when the priority system is configured to allocate a rank/priority in accordance with the time of connection to the sound reproduction apparatus 22, a higher rank/priority may be provided to a control apparatus 24 which makes an earlier connection with the sound reproduction apparatus 22, with the time window being on a day-by-day basis. Alternatively, a higher rank/priority may be provided to a control apparatus 24 which makes a most recent connection to the sound reproduction apparatus 22.

Similarly, when the priority system is configured to allocate a rank/priority in accordance with the type of the control apparatus 24, a higher rank/priority may be provided to a control apparatus 24 from, for example, a particular manufacturer, a particular type of device, a particular model for type of device, and so forth.

In addition, when the priority system is configured to allocate a rank/priority in accordance with the type of the identity of a user of the control apparatus 24, a higher rank/priority may be provided to the user with a higher level in an organizational hierarchy.

The at least one data channel 26 may be using wireless technologies such as, for example, wi-fi, Bluetooth, UWB, and so forth. It should be appreciated that the form of wireless technology employed for the at least one data channel 26 may affect how the media content is reproduced on the at least one sound reproduction apparatus 22. For example, using a wireless technology which has a lower bandwidth like Bluetooth would typically result in low quality audio playback because of the use of lossy compression to pack an audio stream compactly for the lower bandwidth. The at least one data channel 26 may facilitate bi-directional transfer of data. It should be appreciated that the arrows in FIG. 1 denote movement of media content data in a preferred embodiment.

The control apparatus 24 may be configured to be connected to the at least one sound reproduction apparatus 22 once the control apparatus 24 receives a first signal which indicates a presence of the at least one sound reproduction apparatus 22. The first signal may preferably be of a form which consumes little power during transmission and has a range of at least ten meters. The first signal may be continuously transmitted from the sound reproduction apparatus 22 in either a standby state or a fully powered state. The continuous transmission of the first signal may happen (when the sound reproduction apparatus 22 is in either a standby state or a fully powered state) either at all times or at pre-determined time periods. The pre-determined time periods may be related to when a user typically uses the sound reproduction apparatus 22, for instance, between 0730 hr-0830 hr, between 1900 hr-2200 hr, and so forth. Alternatively, the first signal may be transmitted at predetermined intervals from the sound reproduction apparatus 22, such as, for example, every five minutes, every ten minutes, and so forth. It should be appreciated that the first signal may be transmitted via the at least one data channel 26. However, the first signal may not be transmitted via the at least one data channel 26 so as to avoid taking up bandwidth of the at least one data channel 26.

Reception of the first signal on the control apparatus 24 initiates a first process to enable wireless connection between the control apparatus 24 and the at least one sound reproduction apparatus 22. The first process may depend on a type of signal used for the first signal and may be any wireless connection process for a particular type of signal. For instance, the first process may be a "hand-shake" process which leads to the wireless connection between the control apparatus 24 and the at least one sound reproduction apparatus 22. The control apparatus 24 may indicate an inability to wirelessly connect with the at least one sound reproduction apparatus 22 on a display 28 if the first process fails. In the event when the control apparatus 24 fails to wirelessly connect with the at least one sound reproduction apparatus 22 with the first process, the control apparatus 24 may provide a step-by-step guide of the first process on the display 28 for manually configuring the control apparatus 24 to enable a wireless connection between with the at least one sound reproduction apparatus 22. It is advantageous that the system 20 enables the wireless connection between the control apparatus 24 and the at least one sound reproduction apparatus 22 to be convenient for the user. The display 28 of the control apparatus 24 may also show at least one image of the media content being reproduced using the system 20.

In the system 20, the control apparatus 24 may also be wirelessly connectable to at least one data storage apparatus 30 on the data network 32. It should be appreciated that problems relating to online security with regard to wireless connection to the at least one data storage apparatus 30 on the data network 32 may be overcome using known methods and processes.

The control apparatus 24 may be wirelessly connectable to the data network 32 using wireless technologies such as, for example, wi-fi, Bluetooth, UWB, and so forth. While the Internet has been used to illustrate the data network 32, it should be appreciated that the data network 32 may also include, for example, local area networks, wide area networks and so forth. The at least one data storage apparatus 30 may be, for example, a server, a personal storage facility, a portable storage apparatus, and so forth.

The control apparatus 24 may also be wirelessly connectable directly with at least one on-site storage apparatus 34, the on-site storage apparatus 34 being in close proximity with the at least one sound reproduction apparatus 22. Close proximity of the at least one sound reproduction apparatus 22 may be, for example, within a same room, within a same level, within a same building 31 and so forth.

The control apparatus 24 may be configured to be connected to the at least one on-site storage apparatus 34 once the control apparatus 24 receives a second signal which indicates a presence of the at least one on-site storage apparatus 34. The second signal may preferably be of a form which consumes little power during transmission and has a range of at least ten meters. The second signal may be continuously transmitted from the at least one on-site storage apparatus 34 in either a standby state or a fully powered state. The continuous transmission of the second signal may happen (when the at least one on-site storage apparatus 34 is in either a standby state or a fully powered state) either at all times or at pre-determined time periods. The pre-determined time periods may be related to when a user typically uses the at least one on-site storage apparatus 34, for instance, between 0730 hr-0830 hr, between 1900 hr-2200 hr, and so forth. Alternatively, the second signal may be transmitted at pre-determined intervals from the at least one on-site storage apparatus 34, such as, for example, every five minutes, every ten minutes, and so forth. It should be appreciated that the second signal may be transmitted via the at least one data channel 26. However, the second signal may not be transmitted via the at least one data channel 26 so as to avoid taking up bandwidth of the at least one data channel 26.

Reception of the second signal on the control apparatus 24 initiates a second process to enable wireless connection between the control apparatus 24 and the at least one on-site storage apparatus 22. The second process may depend on a type of signal used for the second signal and may be any wireless connection process for a particular type of signal. For instance, the second process may be a "hand-shake" process which leads to the wireless connection between the control apparatus 24 and the at least one on-site storage apparatus 34. The control apparatus 24 may indicate an inability to wirelessly connect with the at least one on-site storage apparatus 34 on a display 28 if the second process fails. In the event when the control apparatus 24 fails to wirelessly connect with the at least one on-site storage apparatus 22 with the second process, the control apparatus 24 may provide a step-by-step guide of the second process on the display 28 for manually configuring the control apparatus 24 to enable a wireless connection between with the at least one on-site storage apparatus 34. It is advantageous that the system 20 enables the wireless connection between the control apparatus 24 and the at least one on-site storage apparatus 22 to be convenient for the user.

It should be appreciated that the at least one on-site storage apparatus 34 may also be wirelessly connected to the control apparatus 24 via the data network 32 in the instances of either failure of the second process or preferred choice of the user.

Figure 3:
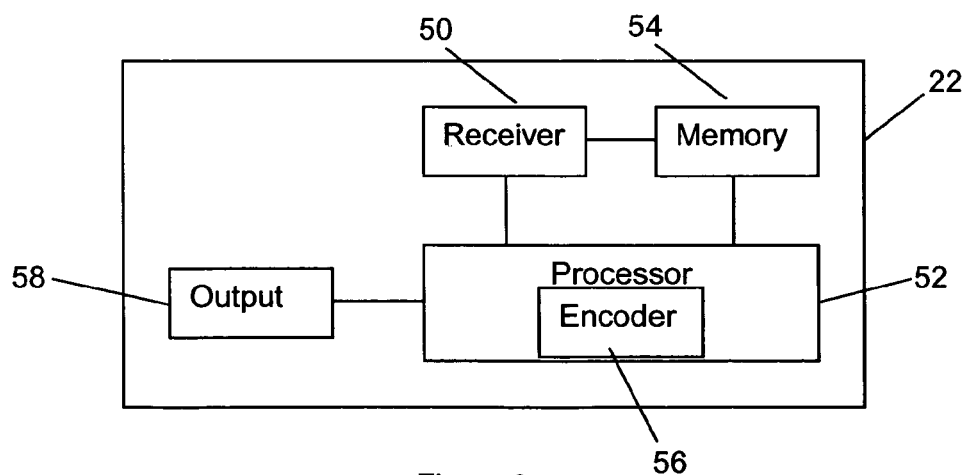
FIG. 3 shows a schematic view of a sound reproduction apparatus of the present invention.

Referring to FIG. 3, there is shown a schematic view of the at least one sound reproduction apparatus 22 of the system 20. It should be appreciated that the lines between components of the at least one sound reproduction apparatus 22 in FIG. 3 denote a functional connection between the components. Each line may be construed to be a data line, a control line or both of the aforementioned lines.

The at least one sound reproduction apparatus 22 includes a wireless receiver 50 for receiving the audio signals from the control apparatus 24. The wireless receiver 50 may also receive audio signals directly from the data network 32. The audio signals may be received directly from the data network 32 in response to instructions received on the at least one sound reproduction apparatus 22 where the control apparatus 24 may be either present or absent. Functions of the wireless receiver 50 may be controlled by the processor 52. A memory module 54 which is also controlled by the processor 52 may store the received audio signals from the wireless receiver 50. The audio signals may be passed through an audio file encoder 56 for reproduction of the received audio signals through an output 58 of the at least one sound reproduction apparatus 22.

In an instance when the control apparatus 24 does not transfer audio signals to the at least one sound reproduction apparatus 22 (even though the control apparatus 24 is controlling output from the at least one sound reproduction apparatus 22) because the audio signals are already present in the at least one sound reproduction apparatus 22, power consumption on the control apparatus 24 is reduced because transmission of the audio signals from the control apparatus 24 is not required.

The output 58 may be, for example, speaker drivers, headphone drivers and so forth. The audio file encoder 56 may be either incorporated within or coupled to the processor 52. Even though the at least one sound reproduction apparatus 22 includes the processor 52, the at least one sound reproduction apparatus 22 may either operate only with use of the control apparatus 24 or operate independently without the control apparatus 24. As such, the at least one sound reproduction apparatus 22 may be operable in two modes, a first mode of operating only with use of the control apparatus 24 and a second mode of operating independently without the control apparatus 24.

Storage of the received audio signals in the memory module 54 may be either transient or permanent. The received audio signals may be played back in a streaming form if the received audio signals are not stored in its entirety in the memory module 54. Similarly, the received audio signals may be played back in a stored-data playback manner if the received audio signals are stored in its entirety in the memory module 54. Permanent storage of the received audio signals may enable the at least one sound reproduction apparatus 22 to function like a depository for audio files (when all the audio signals are combined). The memory module 54 may also store a profile of the control apparatus 24 which has previously been wirelessly connected to the at least one sound reproduction apparatus 22. A presence of the profile of the control apparatus 24 would indicate an earlier association of the at least one sound reproduction apparatus 22 with the control apparatus 24.

Playback of the audio signals stored in the memory module 54 may be monitored by the processor 52, where playback parameters such as, for example, playback frequency, playback timings, playback by user profile, and the like, are monitored using the processor 52. The playback parameters are used to determine characteristics pertaining to the playback of the audio signals by the at least one sound reproduction apparatus 22. The playback parameters may be determined either per user profile or regardless of user profile. The playback parameters may be used by the processor 22 to assess the audio signals. It may be possible for audio signals with low playback frequency to be deleted (purged) from the memory module 54. The assessment of the audio signals may be conducted by the processor 22 at a pre-determined time, such as, for example, weekly, monthly, annually, and so forth.

When the memory module 54 acts as permanent storage of the received audio signals, the sound reproduction apparatus 22 may be able to function independently to playback the audio files stored in the memory module 54. In a possible embodiment, the processor 52 may time-stamp when the audio signals are received at the sound reproduction apparatus 22, and the sound reproduction apparatus 22 may playback the audio files in the memory module 54 in accordance with the time-stamp of the audio file. The time-stamp of the audio file may aid in categorizing which time slot the audio file should be grouped within for playback. The time slots may be, for example, half-hourly, hourly, two-hourly, and so forth. For instance, an audio file with a time-stamp of 0845 hr will be categorized within a 0830 hr-0900 hr timeslot. This would enable predictable playback of audio files even without a presence of the control apparatus 24. However, the audio files categorized within a particular time slot may be played back in a random order.

When the control apparatus 24 is wirelessly connected to the at least one sound reproduction apparatus 22 and the profile of the control apparatus 24 matches a profile in the memory module 54, settings of the at least one sound reproduction apparatus 22 are changed to match settings of the profile of the control apparatus 24 identified in the memory module 54. The settings may relate to control of sound reproduction parameters like, for instance, bass, treble, volume, equaliser settings, effects settings, and so forth. The stored settings associated with the profiles may be the last settings of the at least one sound reproduction apparatus 22 before the control apparatus 24 was disconnected from the at least one sound reproduction apparatus 22.

The control apparatus 24 may be configured to control the at least one sound reproduction apparatus 22. Control of the at least one sound reproduction apparatus 22 may relate to control of sound reproduction parameters like, for instance, bass, treble, volume, equaliser settings, effects settings, and so forth. In addition, the control of the at least one sound reproduction apparatus 22 may also include selecting content stored on the memory module 54 of the at least one sound reproduction apparatus 22 for reproduction.

Figure 2:
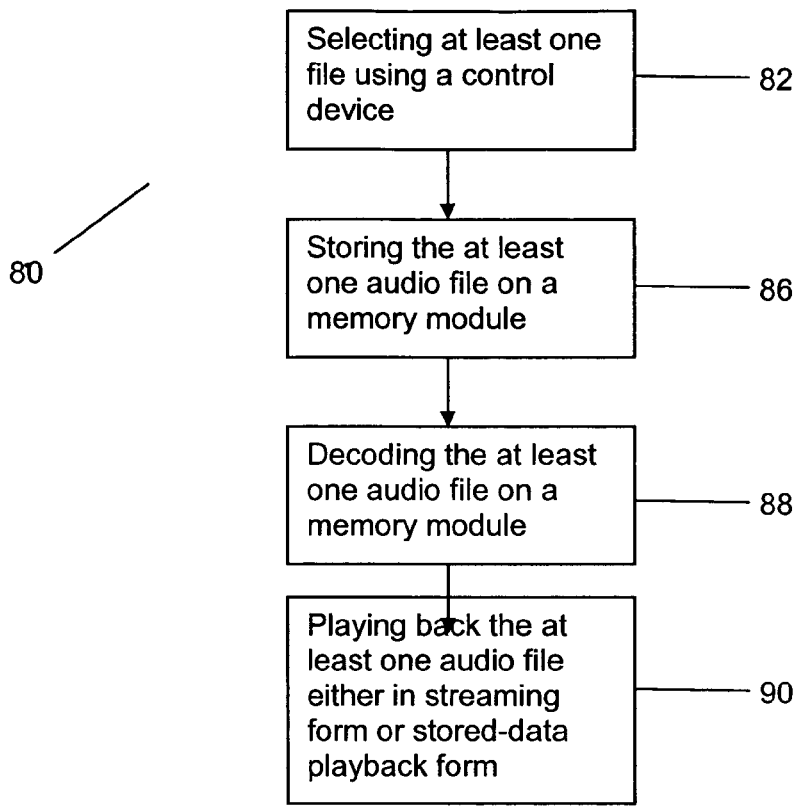
FIG. 2 shows a process flow of a method for wireless transmission of audio files as employed in the preferred embodiment.

In a second aspect of the present invention, with reference to FIG. 2, there is provided a method 80 for wireless transmission of at least one audio file to a sound reproduction apparatus and subsequent playback of the at least one audio file. The method 80 may be used in the aforementioned system 20 for transferring the audio signals of the media content to the at least one sound reproduction apparatus 22. It should be appreciated that the wireless connectivity of the system 20 is an aspect of the method 80.

The method 80 includes selecting the at least one audio file using the control device 24 (82). The at least one audio file may be either stored on the control apparatus 24 or received via a data network 32 from at least one source on the data network 32.

The at least one audio file received by the sound reproduction apparatus 22 may be stored on the memory module 54 of the sound reproduction apparatus 22 (86) either in a transient or a permanent form. The audio files may be accessible for reproduction in an order selected using the control device 24.

The at least one audio file is decoded in the order selected using the control device 24 (88) and the at least one audio file is played back on the sound reproduction apparatus 22 either in a streaming form or a stored-data playback form (90). The at least one audio file may be played back in a streaming form if the at least one audio file is not stored in its entirety in the memory module 54. Similarly, the at least one audio file may be played back in a stored-data playback manner if the at least one audio file is stored in its entirety in the memory module 54.

It should be appreciated that the at least one audio file is received either via the at least one control apparatus or direct from the data network.

Whilst there has been described in the foregoing description preferred embodiments of the present invention, it will be understood by those skilled in the technology concerned that many variations or modifications in details of design or construction may be made without departing from the present invention.

The invention claimed is:

1. A system for reproduction of media content, the system including:
   at least one sound reproduction apparatus being wirelessly connectable to a plurality of control apparatuses via at least one data channel, at least one control apparatus from the plurality of control apparatuses being connected to the at least one sound reproduction apparatus once the at least one control apparatus receives a first signal indicating a presence of the at least one sound reproduction apparatus; and
   the at least one control apparatus being wirelessly connectable to at least one data storage apparatus on a data network,
   wherein the at least one sound reproduction apparatus plays back audio signals of the media content which is either stored on the at least one control apparatus or received via the data network, and with the audio signals of the media content being received at a memory module of the at least one sound reproduction apparatus,
   wherein the memory module stores a profile of the at least one control apparatus to indicate an earlier association of the at least one sound reproduction apparatus with the at least one control apparatus, the profile comprising sound settings in which the at least one sound reproduction apparatus would match when the at least one control apparatus is subsequently connected to the at least one sound reproduction apparatus again;
   wherein one of rank and priority is allocatable to at least one control apparatus from the plurality of control apparatuses, and
   wherein commands sent by a control apparatus allocated with one of lower rank and lower priority are one of ignored and over-ridden if commands are sent by another control apparatus allocated with one of higher rank and higher priority.

2. The system of claim 1, wherein the at least one control apparatus is wirelessly connectable directly with at least one on-site storage apparatus, the at least one control apparatus being connected to the at least one on-site storage apparatus once the at least one control apparatus receives a second signal indicating a presence of the at least one on-site storage apparatus.

3. The system of claim 1, wherein the audio signals are received at the memory module either in a transient form or a permanent form.

4. The system of claim 1, wherein the at least one sound reproduction apparatus further includes controls configured to playback the received audio signals stored in the memory module.

5. The system of claim 1, wherein reception of the first signal on the at least one control apparatus initiates a first process to enable wireless connection between the at least one control apparatus and the at least one sound reproduction apparatus.

6. The system of claim 2, wherein reception of the second signal initiates a second process to enable wireless connection between the at least one control apparatus and the at least one on-site storage apparatus.

7. The system of claim 6, wherein consumption of power, by each of the first and second signals, is low during transmission and the transmission of each thereof is of a range of at least ten meters.

8. The system of claim 1, wherein a priority system is employed by the at least one sound reproduction apparatus to organize the at least one control apparatus in a manner so as to allocate one of priority and rank to the at least one control apparatus.

9. The system of claim 8, wherein the priority system allocates a rank/priority depending on a factor selected from a group comprising: time of connection to the at least one sound reproduction apparatus, type of the at least one control apparatus, and identity of a user of the at least one control apparatus.

10. The system of claim 1, wherein the audio signals are played back either in a streaming form or a stored-data playback form, the form depending on the audio signals stored in the memory module.

11. The system of claim 10, wherein the received audio signals are time-stamped.

12. The system of claim 11, wherein categorization of the audio signals for playback when the at least one control apparatus is not present is by time-slots, with the time-stamp determining time-slot category.

13. The system of claim 12, wherein the playback of the audio signals in each time-slot is in a random order.

14. The system of claim 1, wherein the audio signals are received either via the at least one control apparatus or direct from the data network.

15. The system of claim 1, wherein the at least one sound reproduction apparatus is operable in two modes, with a first mode of operation being with use of the at least one control apparatus, and a second mode of operation being independent of the at least one control apparatus.

16. The system of claim 1, wherein the at least one control apparatus does not transmit audio signals of the media content to the at least one sound reproduction apparatus when the audio signals are present on the at least one sound reproduction apparatus, the non-transmission of audio signals minimizing power consumption of the at least one control apparatus.

17. The system of claim 1, wherein at least one image of the media content is viewable on a display of the at least one control apparatus.

18. A method for wireless transmission of at least one audio file to a sound reproduction apparatus which is connectable to a plurality of control apparatuses and subsequent playback of the at least one audio file, the method including:
   selecting the at least one audio file using at least one control apparatus from the plurality of control apparatuses, the at least one control apparatus being allocatable with one of rank and priority, wherein commands sent by a control apparatus allocated with one of lower rank and lower priority are one of ignored and over-ridden if commands are sent by another control apparatus allocated with one of higher rank and higher priority;
   storing the at least one audio file on a memory module of the sound reproduction apparatus in an order selected using the control apparatus;
   decoding the at least one audio file in the order selected using the control apparatus;
   playing back the at least one audio file on the sound reproduction apparatus, wherein the at least one audio file is played back either in a streaming form or a stored-data playback form, the form depending on the at least one audio file stored in the memory module; and
   storing a profile of the at least one control apparatus to indicate an earlier association of the sound reproduction apparatus with the at least one control apparatus, the profile comprising sound settings in which the sound reproduction apparatus would match when the at least one control apparatus is subsequently connected to the sound reproduction apparatus again.

* * * * *